July 2, 1946.  H. W. TREVASKIS  2,403,315
SOLENOID
Filed Jan. 6, 1945
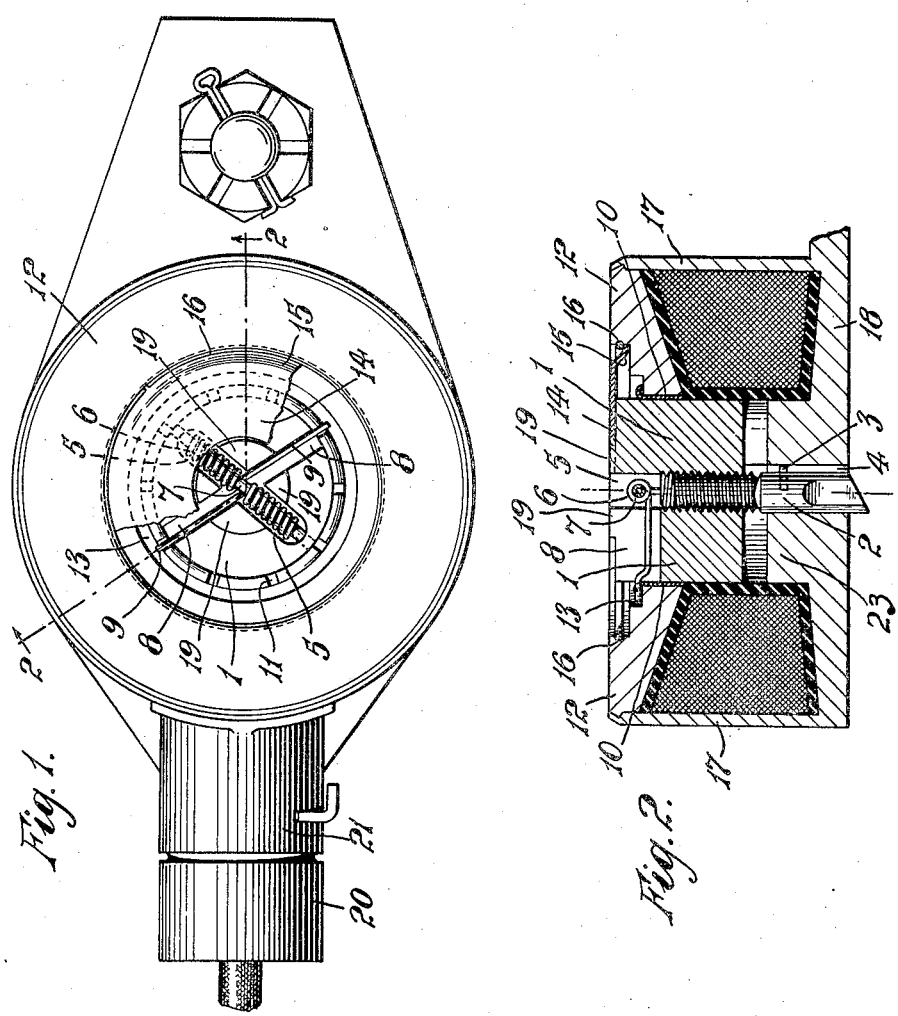
Henry William Trevaskis
Inventor
by Benj T Rauber
his Attorney Patented July 2, 1946

2,403,315

UNITED STATES PATENT OFFICE 2,403,315

SOLENOID

Henry William Trevaskis, Solihull, Birmingham, England, assignor to Dunlop Rubber Company Limited, London County, England, a company of Great Britain Application January 6, 1945, Serial No. 571,687
In Great Britain April 4, 1944

15 Claims. (Cl. 175—341)

My invention relates to improvements in electric solenoids of the type having a core positioned axially in the solenoid casing by coil springs adapted to permit the core to be rotated for the adjustment of a plunger connected to the core but prevented from rotating relative to the solenoid casing.

A solenoid of the type referred to has already been constructed employing two compression coil springs disposed axially of the casing, one of such springs being carried on the plunger to locate the core in axial relation to the casing and the other of larger diameter being compressible between one end face of the casing and a cap depressible against said larger spring into rotatable engagement with one end of the plunger to adjust said plunger axially relative to the core.

The present invention has for its object to provide a solenoid incorporating improved spring mechanism of compact form adapted to locate the core within the casing. The invention also has for an object to permit access to one end of the core whereby operative displacement of the plunger may be effected manually when so desired as well as relative angular displacement between core and plunger for adjusting the plunger.

According to the present invention a solenoid comprises a rotatable core having axially threaded thereto a plunger prevented from rotating relative to the solenoid casing said core being provided with coil springs extending diametrically of the core each of said springs having an end-portion which projects from the said core to contact with said casing in a plane at right angles to the axis of the said core.

Preferably the coil springs are fitted end to end upon a pin diametrically secured in said core the remote end-portions of the said springs being anchored to the said core and the adjacent end-portions of the said springs each lying in a plane substantially at right angles to the said pin.

The springs may be located in a diametral recess in said core of a depth at least equal to the coil diameter of the springs, the end portions of the springs projecting from the core being axially guided in slots which intersect the diametrical recess containing the springs.

In order that the invention may be more readily understood and carried into effect the same will now be described with reference to the accompanying drawing in which Fig. 1 is a plan view of a solenoid constructed in accordance with the invention.

Fig. 2 is a part sectional view on the line 2—2 of Fig. 1.

Referring to the drawing the improved solenoid comprises a casing which contains a core 1 having a cylindrical body portion to which is threaded a plunger 2, Fig. 2, of relatively small diameter. The body portion of the core is rotatably centered in a circular aperture formed in the upper end-plate 12 of the casing and the plunger 2 is non-rotatably centered in an aperture formed in the lower end-plate 18 of the casing by a key 3, Fig. 2, which is carried by the plunger and engages a keyway 4 on the lower end plate. The upper end of the core has a diametral recess 5 extending nearly from side to side of the core and axially to a depth at least sufficient to accommodate two wire coil springs 6 threaded coaxially end to end upon a tubular pin 7 of which the opposite ends are located in the end walls of the recess provided in the core.

To prevent rotation of the springs about the tubular pin the remote or non-adjacent ends of the two springs are straightened and caused to penetrate holes pierced in the base of the recess 5 or are otherwise anchored thereto.

The adjacent end-portions 9 of the springs 6 in the middle of the core are straightened substantially at right angles to the pin 7 and disposed in deep slots 8 which extend diametrically through the walls of the core substantially at right angles to the recess 5 the extremities of these end-portions 9 projecting from the slots beyond the wall of the core in opposite directions.

The end-surface of the end-plate 12 of the casing is provided around its central aperture with a recessed surface 13 of stepped formation to provide a clearance sufficient to allow of rotational sliding movement of the projecting end-portions 9 of the springs between the end-plate and the cover plate 14.

In securing the cover-plate 14 to the casing a downward movement is imparted to the core against the torsion of the coil spring to which a torsional stress is imparted sufficient to ensure that the core is positively located in spaced relation to the boss 23 of the lower end plate by end contact of the core with the cover plate.

The cover plate 14 is detachably secured to the end plate of the casing by a resilient split ring 16 into engagement with a semi-circular groove formed in the end plate, said ring overlapping a flange 15 provided on the periphery of the cover plate.

The axial extent to which the plunger 2 projects from the end plate 18 is adjusted by rotating the core as by the insertion of a coin through the aperture of the cover plate into the diametrical recess 5 containing the springs whereby axial movement is imparted to the plunger 2 relative to the end plate 18.

In order to retain the core in an angular relation to the casing corresponding to a particular setting of the plunger the projecting end-portions 9 of the springs slide over the end of a thin metal sleeve 10 which is fitted to the upper end plate of the casing, the end of the sleeve 10 having a beaded edge provided at intervals with spaced notches 11 adapted lightly to hold the springs in the required position.

In order to centre the cover plate 14 and facilitate its attachment by the resilient wire ring to the end plate, the cover plate 14 is provided with a central aperture of a diameter equal to and adapted to register with the periphery of four upraised segmented portions 19 formed upon the end of the core and intersected by the slots 8 and diametrical recess 5. The aperture in such coverplate also permits the core and plunger to be operatively displaced by manual pressure when so desired.

The solenoid may be provided with a plug 20 which fits into socket connection 21 of suitable type secured to the cylindrical shell 17 of the casing.

Having described my invention, what I claim is:

1. A solenoid comprising a casing and solenoid windings, a core movable axially in said solenoid and having a threaded axial recess in one end and transverse slots in the opposite end, a plunger threaded into said threaded recess, means to hold said plunger from rotation within said recess, a pin in one of the slots of said core and a pair of coil springs end to end on said pin and secured against rotation thereabout and having extensions in said slots at an angle to said pin and engaging said casing on diametrically opposite sides of said core.

2. A solenoid as claimed in claim 1 wherein the said coil springs are fitted end to end upon the pin diametrically secured in said core, the remote end-portions of the said springs being anchored to the said core and the adjacent end-portions of the said springs each lying in a plane substantially at right angles to the said pin.

3. A solenoid as claimed in claim 1 wherein said core is provided with a diametral recess of a depth of at least equal to the coil diameter of the said springs, said core having slots adapted to guide the end-portions of the said springs projecting therefrom.

4. A solenoid as claimed in claim 1 wherein the bore of the solenoid has fitted thereto a sleeve having spaced notches adapted to locate the end portions of the springs projecting from the said core.

5. A solenoid as claimed in claim 1 comprising a cover plate attached to the solenoid casing said cover plate contacting with the end of the said core remote from the plunger.

6. A solenoid as claimed in claim 1, comprising a cover plate attached to the solenoid casing, said cover plate contacting with the end of the said core remote from the plunger and wherein the said end of the core is provided with central upraised portions and the cover plate with an aperture adapted to register with said upraised portions.

7. The solenoid of claim 1 in which said casing has recesses arranged about said core to receive selectively the extensions of said springs to permit rotational adjustment on said plunger.

8. The solenoid of claim 1 in which said casing has recesses arranged about said core to receive selectively the extensions of said springs to permit rotational adjustment on said plunger and a cover mounted on said casing to limit outward movement of said core.

9. A solenoid comprising a casing and solenoid windings, a core movable axially within said windings, a plunger threaded axially into one end of said core, means to prevent said plunger rotating relatively to said casing and springs projecting from said core to said casing to oppose a resilient resistance to movement of said core into said solenoid and to prevent rotation of said core relatively to said casing.

10. The solenoid of claim 9 in which said spring is a coil spring mounted in said core and having an end projecting into said casing.

11. A solenoid comprising a casing and solenoid windings, a core movable axially in said solenoid and having a threaded axial recess in one end and transverse slots in the opposite end, a plunger threaded into said threaded recess, means to hold said plunger from rotation within said recess and a spring mounted in the recesses in said core and extending transversely into engagement with said casing.

12. The solenoid of claim 11 in which said casing has a series of recesses about said core to receive selectively the end of said spring.

13. A solenoid having a casing, a core rotatable and movable axially in said solenoid, a pair of coil springs mounted in alignment on said core, said coil springs extending diametrically of said core, said casing having a recess at one end to receive said coil springs and having notches arranged in a circumferential series about said core, each of said springs having an end portion extending into one of said notches to prevent rotation of said core, and a plunger threaded axially into said core and engaging the casing of said solenoid to prevent rotation relative thereto but to permit longitudinal movement relative to said solenoid.

14. The solenoid of claim 13 wherein said coil springs are fitted end to end upon a pin diametrically secured in said core the lower end portions of said springs being anchored to said core and adjacent end portions of said springs each lying in a plane substantially at right angles to said pin.

15. The solenoid of claim 13 wherein said core is provided with a diametrical recess of a depth sufficient to receive said springs and having slots positioned to guide the end portions of said springs projecting therefrom.

HENRY WILLIAM TREVASKIS.